US011837967B2

(12) United States Patent
Spesser et al.

(10) Patent No.: US 11,837,967 B2
(45) Date of Patent: Dec. 5, 2023

(54) RECTIFIER ARRANGEMENT WITH CONNECTIONS, CIRCUIT ARRANGEMENTS AND AN INTERCONNECTION APPARATUS THAT HAS SWITCHES TO ENABLE DIFFERENT CONFIGURATIONS BETWEEN THE CONNECTIONS AND THE CIRCUIT ARRANGEMENTS

(71) Applicant: Dr. Ing. h.c. F. Porsche Aktiengesellschaft, Stuttgart (DE)

(72) Inventors: Daniel Spesser, Illingen (DE); Tim Pfizenmaier, Leonberg (DE); Florian Mayer, Freiberg am Neckar (DE); Stefan Endres, Reichenschwand (DE)

(73) Assignee: Dr. Ing. h. c. F. Porsche AG., Stuttgart (DE)

( * ) Notice: Subject to any disclaimer, the term of this patent is extended or adjusted under 35 U.S.C. 154(b) by 90 days.

(21) Appl. No.: 17/382,252

(22) Filed: Jul. 21, 2021

(65) Prior Publication Data
US 2022/0029554 A1      Jan. 27, 2022

(30) Foreign Application Priority Data
Jul. 21, 2020 (DE) ...................... 10 2020 119 104.9

(51) Int. Cl.
*H02M 7/217* (2006.01)
*H02M 1/10* (2006.01)

(52) U.S. Cl.
CPC .............. *H02M 7/217* (2013.01); *H02M 1/10* (2013.01)

(58) Field of Classification Search
CPC .. H02M 1/0074; H02M 1/0077; H02M 1/008; H02M 1/0083; H02M 7/02;
(Continued)

(56) References Cited

U.S. PATENT DOCUMENTS

| 5,952,812 A | 9/1999 | Maeda |
| 10,391,870 B2 * | 8/2019 | Götz ....................... B60L 53/62 |

(Continued)

FOREIGN PATENT DOCUMENTS

| DE | 10 2018 217 599 | 4/2020 |
| DE | 102018221969 A1 * | 6/2020 |

(Continued)

OTHER PUBLICATIONS

German Examination Report dated Nov. 30, 2020.
(Continued)

*Primary Examiner* — Gustavo A Rosario-Benitez
(74) *Attorney, Agent, or Firm* — Gerald E. Hespos; Michael J Porco

(57) ABSTRACT

A rectifier arrangement for rectifying an AC voltage into a DC voltage has connections, circuit arrangements, an interconnection apparatus and an intermediate circuit. Each circuit arrangement has first and second circuit arrangement connections, between which a changeover arrangement and a coil are connected in series with the changeover arrangement. The changeover arrangements are interconnected to the intermediate circuit. The interconnection apparatus is designed to enable at least a first configuration and a second configuration. In the first configuration, the circuit arrangements form a first group and a second group, with two connections connected to the circuit arrangements in the first group, but not to the circuit arrangements in the second group, and two connections are connected to the circuit arrangements in the second group, but not to the circuit arrangements in the first group. In the second configuration, at least one of the connections is connected to all circuit arrangements.

13 Claims, 8 Drawing Sheets

(58) Field of Classification Search
CPC ............ H02M 7/04; H02M 7/08; H02M 7/10; H02M 7/12; H02M 7/217; H02M 7/219; H02M 7/23; H02M 7/25
See application file for complete search history.

(56) References Cited

U.S. PATENT DOCUMENTS

| | | | |
|---|---|---|---|
| 10,396,680 B1* | 8/2019 | Rozman | H02M 7/2176 |
| 2008/0259663 A1* | 10/2008 | Perkinson | H02M 1/4216 363/125 |
| 2010/0220501 A1 | 9/2010 | Krause | |
| 2014/0301119 A1* | 10/2014 | Chiang | H02M 7/4835 363/44 |
| 2015/0054343 A1* | 2/2015 | Cui | H02J 7/02 307/66 |
| 2015/0061606 A1 | 3/2015 | Pan et al. | |
| 2015/0155791 A1* | 6/2015 | Bao | H02M 7/19 363/17 |
| 2018/0152032 A1* | 5/2018 | Götz | H02J 7/0045 |
| 2019/0006951 A1* | 1/2019 | Huggenberger | H02M 7/04 |
| 2020/0052608 A1* | 2/2020 | Bala | H02M 7/219 |
| 2020/0295650 A1 | 9/2020 | Spesser et al. | |
| 2023/0096572 A1* | 3/2023 | Pfeilschifter | B60L 58/27 307/9.1 |

FOREIGN PATENT DOCUMENTS

| | | |
|---|---|---|
| DE | 10 2019 106 485 | 9/2020 |
| EP | 0 660 498 | 6/1995 |
| EP | 2 567 857 | 3/2013 |

OTHER PUBLICATIONS

J.C. Le Claire—"Double boost effect topology for three-phase AC/DC converter with unity power factor"—2009 13th European Conference on Power Electronics and Applications Year: 2009, Conference Paper, Publisher: IEEE.
French Search Report dated Apr. 21, 2023.

* cited by examiner

RECTIFIER ARRANGEMENT WITH CONNECTIONS, CIRCUIT ARRANGEMENTS AND AN INTERCONNECTION APPARATUS THAT HAS SWITCHES TO ENABLE DIFFERENT CONFIGURATIONS BETWEEN THE CONNECTIONS AND THE CIRCUIT ARRANGEMENTS

CROSS REFERENCE TO RELATED APPLICATION

This application claims priority under 35 USC 119 to German Patent Appl. No. 10 2020 119 104.9 filed on Jul. 21, 2020, the entire disclosure of which is incorporated herein by reference.

BACKGROUND

Field of the Invention

The invention relates to a rectifier arrangement.

Related Art

US 2015/0061606 A1 discloses a rectifier for generators having different speeds and a plurality of passive rectifiers which are connected in series.

U.S. Pat. No. 5,952,812 A discloses an inductance or coil which is connected in parallel with input connections of a rectifier.

US 2010/0220501 A1 discloses a rectifier which is connected, on the output side, to two inverters which are connected in parallel and each supply an associated transformer.

EP 2 567 857 A1 discloses an interconnection of all phases of a voltage converter by means of a switching mechanism.

EP 0 660 498 A2 discloses a Vienna rectifier and its method of operation.

It is an object of the invention to provide a new rectifier arrangement.

The object is achieved by the subject matter of claim 1.

SUMMARY

A rectifier arrangement for rectifying an AC voltage into a DC voltage has connections, circuit arrangements, an interconnection apparatus and an intermediate circuit. The connections comprise a first connection, a second connection, a third connection and a fourth connection. The intermediate circuit has a first line, a second line and at least one capacitor between the first line and the second line. Each of the circuit arrangements has a first circuit arrangement connection and a second circuit arrangement connection. Each of the circuit arrangements further has a changeover arrangement and a coil connected in series with the first and second changeover arrangement connections. The order of the changeover arrangement and the coil between the first circuit arrangement connections and the associated second circuit arrangement connections of the circuit arrangements is the same in each case. The changeover arrangements are interconnected to the first line and to the second line of the intermediate circuit. The interconnection apparatus is designed to enable at least one of a first configuration and a second configuration. In the first configuration of the interconnection apparatus, the circuit arrangements form a first group and a second group, with the first connection and the fourth connection being connected to the circuit arrangements in the first group, but not to the circuit arrangements in the second group, and with the second connection and the third connection being connected to the circuit arrangements in the second group, but not to the circuit arrangements in the first group. In the second configuration of the interconnection apparatus, at least one of the connections is connected to all circuit arrangements.

The interconnection apparatus therefore enables different configurations between the connections and the circuit arrangements.

The first configuration enables two independent current paths via the first group and the second group of circuit arrangements. As a result, the maximum current at the connections is lower than when individual connections are interconnected. Since, for example when using the rectifier arrangement in a vehicle, the connections are connected to a charging post via a charging plug, the charging plug can be designed for lower maximum currents at the individual connections. This reduces the technical complexity and the costs.

The second configuration which differs from the first configuration makes it possible to use a neutral conductor on all circuit arrangements since at least one connection is connected to all circuit arrangements. The connection can be made, for example, to all first circuit arrangement connections, to all second circuit arrangement connections or to half of the first circuit arrangement connections and half of the second circuit arrangement connections.

According to one preferred embodiment, the order between the first circuit arrangement connection and the second circuit arrangement connection is as follows:
first circuit arrangement connection,
changeover arrangement,
coil,
second circuit arrangement connection.

According to one preferred embodiment, the order between the first circuit arrangement connection and the second circuit arrangement connection is as follows:
first circuit arrangement connection,
coil,
changeover arrangement,
second circuit arrangement connection.

According to one preferred embodiment, the interconnection apparatus is designed, in the case of the second configuration, to connect the at least one connection, which is connected to all circuit arrangements, to at least one first circuit arrangement connection of one of the circuit arrangements and to at least one second circuit arrangement connection of another of the circuit arrangements. This makes it possible to use the neutral conductor for one circuit arrangement in a first direction and for another circuit arrangement in an opposite, second direction.

According to one preferred embodiment, the interconnection apparatus is designed to enable a third configuration which corresponds to the second configuration, wherein at least two of the connections are connected to all circuit arrangements. As a result, in the case of a single-phase supply network, a first phase may be connected to all circuit arrangements and a second phase or a neutral conductor may likewise be connected to all circuit arrangements. The other connections may be connected to one of the first-mentioned connections or may not be connected.

According to one preferred embodiment, the interconnection apparatus is designed to enable a fourth configuration which corresponds to the second configuration, wherein the fourth connection is connected to all circuit arrangements, and the first connection, the second connection and the third connection are each connected to an associated subset of circuit arrangements. The designation of the fourth configuration is used to distinguish from the other configurations and does not mean that there has to be a third configuration. The fourth configuration advantageously makes it possible to connect a supply network having a plurality of phases and a neutral conductor.

According to one preferred embodiment, in the case of the fourth configuration, the first connection, the second connection and the third connection are each connected to at least one first circuit arrangement connection and to at least one second circuit arrangement connection of the associated subset of circuit arrangements. This makes it possible to use two circuit arrangements in mutually opposite directions for each phase.

According to one preferred embodiment, the number of circuit arrangements in the first group is not equal to the number of circuit arrangements in the second group. This measure reduces the switches required for the interconnection apparatus. A reduction in the number of switches reduces the electrical resistance, on the one hand, and the costs of the switches are reduced, on the other hand. This embodiment is also advantageous if two of the connections are designed for higher currents.

According to one preferred embodiment, the number of circuit arrangements in the first group is equal to the number of circuit arrangements in the second group. As a result, the current can be distributed more uniformly over the connections than in the case of an unequal number.

According to one preferred embodiment, the rectifier arrangement has an even number of circuit arrangements, and, in the case of the second configuration, the at least one connection, which is connected to all circuit arrangements, is connected to the second circuit arrangement connection in the case of half of the circuit arrangements and is connected to the first circuit arrangement connection in the case of the other half of the circuit arrangements. This makes it possible to use one half of the circuit arrangements in the normal direction and another half of the circuit arrangements in the inverse direction.

According to one preferred embodiment, the circuit arrangements have at least two first circuit arrangements and at least two second circuit arrangements, which at least two first circuit arrangements are each electrically connected to a first point via the first circuit arrangement connection or via the second circuit arrangement connection, which at least two second circuit arrangements are each electrically connected to a second point via the first circuit arrangement connection or via the second circuit arrangement connection, and the interconnection apparatus is designed to enable either an electrical connection of the first point and the second point or a disconnection of this electrical connection. This design of the interconnection apparatus reduces the number of switches needed for the different configurations.

According to one preferred embodiment, the rectifier arrangement has at least six circuit arrangements. Most configurations for single-phase and three-phase supply networks can be implemented using six circuit arrangements. Additional circuit arrangements are naturally possible.

According to one preferred embodiment, each first circuit arrangement connection of one circuit arrangement is permanently connected to at least one second circuit arrangement connection of another circuit arrangement, and each second circuit arrangement connection of one circuit arrangement is permanently connected to at least one first circuit arrangement connection of another circuit arrangement. This reduces the number of switches needed for the interconnection apparatus.

According to one preferred embodiment, the changeover apparatus has a first changeover apparatus connection and a second changeover apparatus connection and is designed
- to enable a current from the first changeover apparatus connection or from the second changeover apparatus connection to the first line,
- to enable a current from the second line to the first changeover apparatus connection or to the second changeover apparatus connection,
- to prevent a current between the first changeover apparatus connection and the second changeover apparatus connection in a first changeover apparatus state, and
- to enable a current between the first changeover apparatus connection and the second changeover apparatus connection in a second changeover apparatus state.

According to one preferred embodiment, a current controller for controlling the current flowing through the changeover apparatus is respectively assigned to the changeover apparatuses. This makes it possible to limit the maximum current at the connections.

Further details and advantageous refinements of the invention will emerge from the exemplary embodiments described below and illustrated in the drawings, which embodiments should in no way be understood as restricting the invention, and also from the dependent claims.

DETAILED DESCRIPTION

Figure 1:
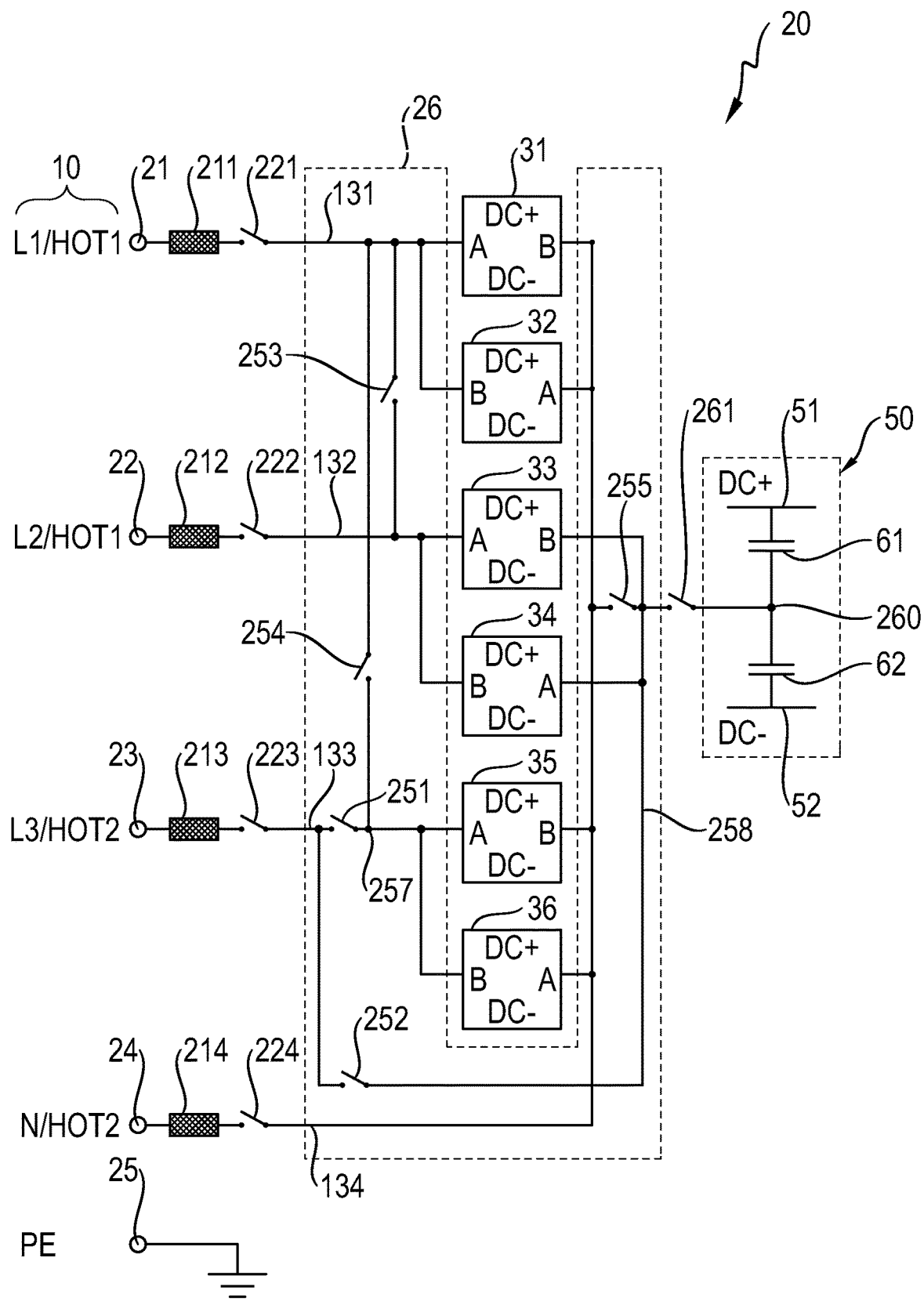
FIG. 1 shows a rectifier arrangement having circuit arrangements and an interconnection apparatus.

The figures will be described in an interrelated and overarching manner. The same reference numerals denote the same elements and these elements are usually described only once.

FIG. 1 shows a rectifier arrangement 20 for rectifying an AC voltage into a DC voltage. The rectifier arrangement 20 has connections 21, 22, 23, 24 and 25, via which the rectifier arrangement can be connected to a supply network 10. In the exemplary embodiment, the rectifier arrangement 20 has six circuit arrangements 31, 32, 33, 34, 35 and 36 each having a first circuit arrangement connection A and a second circuit arrangement connection B. The rectifier arrangement 20 has a DC intermediate circuit 50 having a first line 51 (DC+), a second line 52 (DC−) and at least one capacitor 61, 62 between the first line 51 and the second line 52. The first line 51 and the second line 52 are each connected to the circuit arrangements 31 to 36, and this is indicated by the designation DC+ and DC− in the circuit arrangements.

The connection 21 is connected to a point 131 via an interference suppression choke 211 and a switch 221. The connection 22 is connected to a point 132 via an interference suppression choke 212 and a switch 222. The connection 23 is connected to a point 133 via an interference suppression choke 213 and a switch 223. The connection 24 is connected to a point 134 via an interference suppression choke 214 and a switch 224. The interference suppression chokes 211, 212, 213 and 214 are used as filters for radio-frequency interference signals. The switches 221, 222, 223 and 224 make it possible to disconnect the rectifier arrangement 20 from the supply network 10. Both the interference suppression chokes 211, 212, 213, 214 and the switches 221, 222, 223 and 224 are not absolutely necessary.

The protective conductor PE can be connected via the connection 25.

An interconnection apparatus 26 has switches 251, 252, 253, 254 and 255.

The function of the switch 223 can be jointly undertaken by the switches 251, 252.

The point 131 is connected to the first circuit arrangement connection A of the circuit arrangement 31 and is connected to the second circuit arrangement connection B of the circuit arrangement 32. In addition, the point 131 is connected to the point 132 via the switch 253 and is connected to a point 257 via a switch 254.

The point 132 is connected to the first circuit arrangement connection A of the circuit arrangement 33 and is connected to the second circuit arrangement connection B of the circuit arrangement 34.

The point 133 is connected to the point 257 via the switch 251 and is connected to a point 258 via the switch 252.

The point 257 is connected to the first circuit arrangement connection A of the circuit arrangement 35 and is connected to the second circuit arrangement connection B of the circuit arrangement 36.

The point 134 is connected to the first circuit arrangement connections A of the circuit arrangements 32 and 36 and is connected to the second circuit arrangement connections B of the circuit arrangements 31 and 35. The point 134 is additionally connected to the point 258 via the switch 255.

The first line 51 is connected to a point 260 via the capacitor 61, and the point 260 is connected to the line 52 via the capacitor 62. The capacitors 61, 62 are also referred to as intermediate circuit capacitors. The point 260 is connected to the point 258 via a switch 261.

Figure 2:
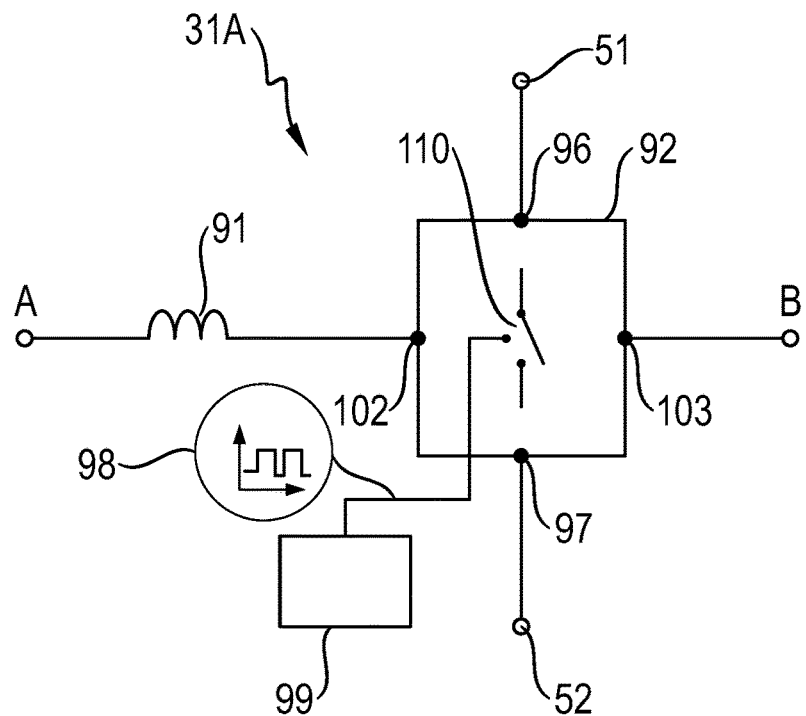
FIG. 2 shows a first embodiment for a circuit arrangement of the rectifier arrangement from FIG. 1 having a changeover arrangement.

FIG. 2 shows a first exemplary embodiment 31A of the circuit arrangement 31. A coil 91 and a changeover arrangement 92 are connected in series between the first circuit arrangement connection A and the second circuit arrangement connection B. The order between the first circuit arrangement connection A and the second circuit arrangement connection B is as follows:
first circuit arrangement connection A
coil 91
changeover arrangement 92
second circuit arrangement connection B.

The changeover arrangement 92 has a connection 102, a connection 103, a connection 96 and a connection 97. The connection 102 is connected to the coil 91, the connection 103 is connected to the second circuit arrangement connection B, the connection 96 is connected to the line 51 and the connection 97 is connected to the line 52.

The changeover arrangement 92 has—schematically indicated—a switch 110 which enables different interconnections between the connections 102, 103, 96 and 97.

A control apparatus 99 is provided for the purpose of commutating the circuit arrangement 31A or 31 and makes it possible—schematically indicated—to supply a clocked signal 98, for example.

Figure 3:
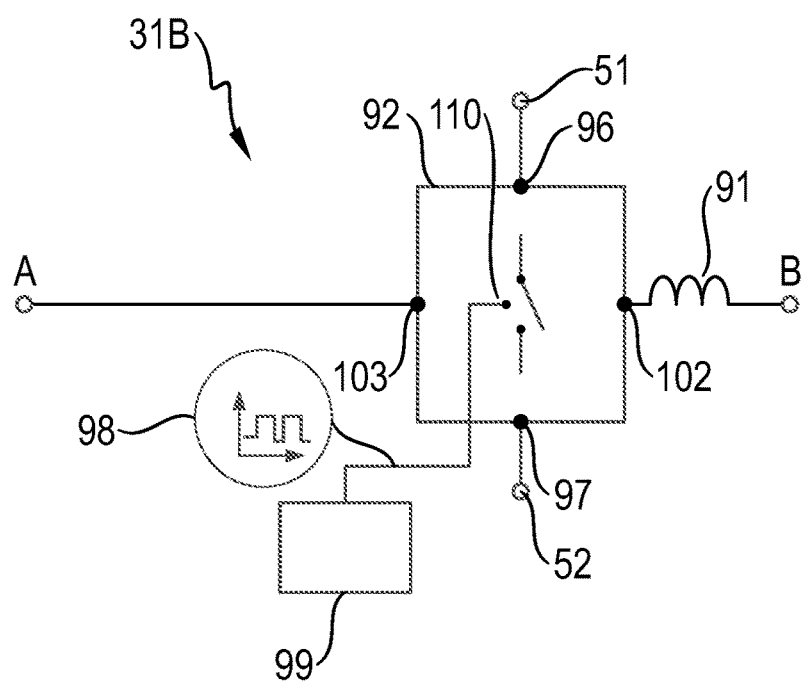
FIG. 3 shows a second embodiment for a circuit arrangement of the rectifier arrangement from FIG. 1 having a changeover arrangement.

FIG. 3 shows a further embodiment 31B of the circuit arrangement 31, in which the order of the coil 91 and the changeover arrangement 92 is swapped. The order is therefore as follows:
first circuit arrangement connection A
changeover arrangement 92
coil 91
second circuit arrangement connection B.

Either all circuit arrangements 31 to 36 are preferably designed like the circuit arrangement 31A or all circuit arrangements 31 to 36 are designed like the circuit arrangement 31B.

The control apparatus 99 from FIG. 2 and FIG. 3 preferably has an integrated current controller. As a result, the current in the circuit arrangements 31 to 36 can be controlled, and the current flowing via the respective connections 21, 22, 23, 24 of FIG. 1 is thereby also limited to the sum of the controlled currents.

Figure 4:
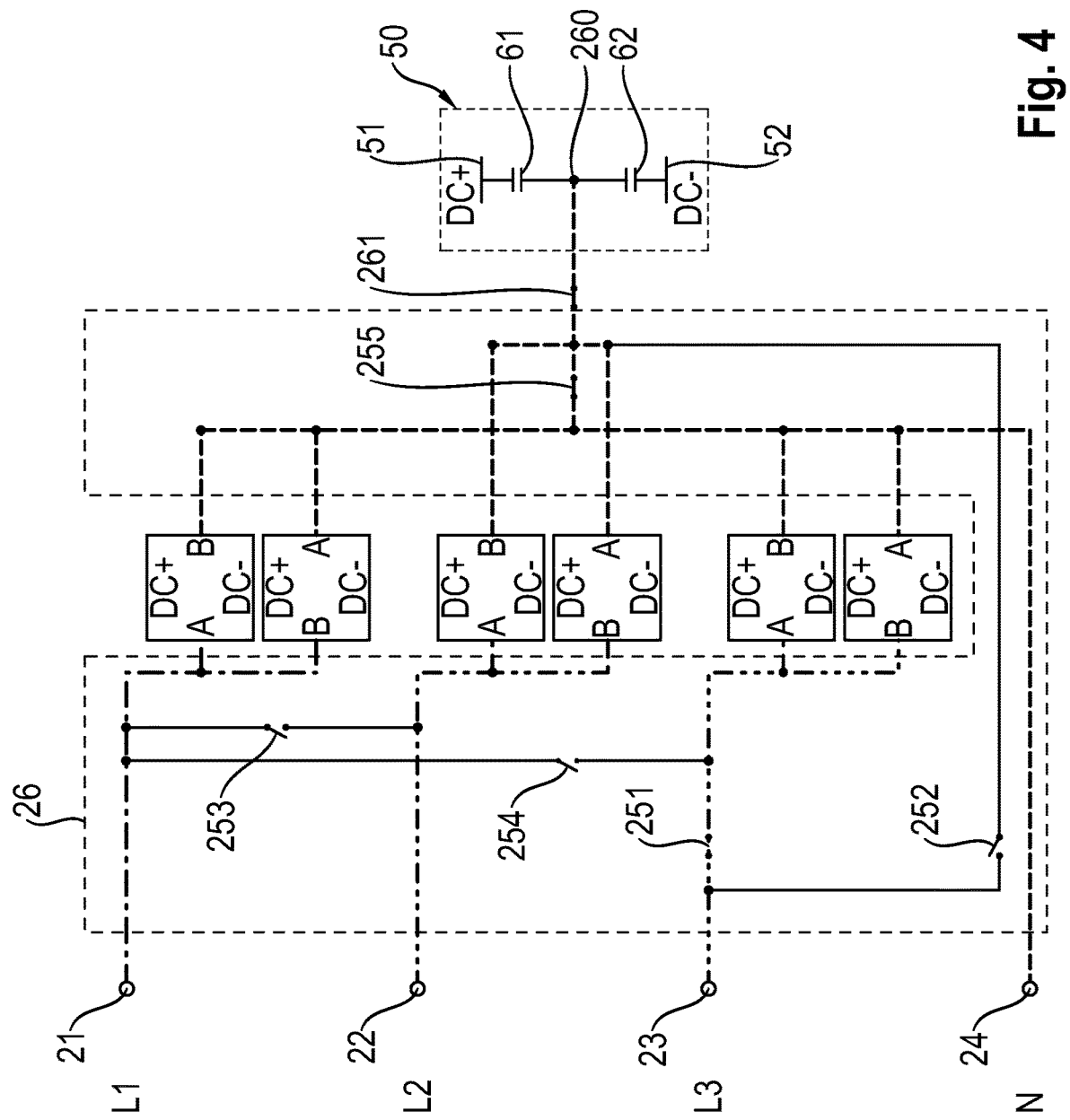
FIG. 4 shows a first configuration of the interconnection apparatus from FIG. 1.

FIG. 4 shows, by way of example, a possible connection of a European three-phase supply network, in which the active conductors of the supply network have the phases L1, L2, L3 and a neutral conductor N. The phase L1 is connected to the connection 21, the phase L2 is connected to the connection 22 and the phase L3 is connected to the connection 23. The neutral conductor N is connected to the connection 24.

The interconnection apparatus 26 is interconnected as follows:

The switch 251 and the switch 255 are turned on, and the switches 252, 253 and 254 are turned off.

This configuration results in the following interconnection of the connections 21 to 24:

The connection 21 is connected to the first circuit arrangement connection A of the circuit arrangements 31 and is connected to the second circuit arrangement connection B of the circuit arrangement 32. The connection 22 is connected to the first circuit arrangement connection A of the circuit arrangements 33 and is connected to the second circuit arrangement connection B of the circuit arrangement 34. The connection 23 is connected to the first circuit arrangement connection A of the circuit arrangements 35 and is connected to the second circuit arrangement connection B of the circuit arrangement 36.

The connection 24 is connected to the first circuit arrangement connections A of the circuit arrangements 32, 34 and 36 and is connected to the second circuit arrangement connections B of the circuit arrangements 31, 33 and 35.

The switch 261 is not part of the interconnection apparatus 26. The point 260 of the intermediate circuit 50 is connected to the connection 24 and therefore to the neutral conductor N via the switch 261 which is turned on. This results in a lower fluctuation of the potential at the point 260. The point 260 is thereby set to the potential of the neutral conductor N, and the voltage at the capacitors 61, 62, which is for example 800 V between the lines 51 and 52, is kept at +/−400 V with respect to the potential on the neutral conductor N. As a result, in the case of an insulation fault, the maximum voltage is kept comparatively low with respect to the potential on the neutral conductor N, and this improves safety. The rectifier arrangement 20 would also function without the switch 261. The lower ripple currents and therefore also the lower fluctuations have a positive effect on the service life of the intermediate circuit.

During rectification, the current flows mainly between the phases L1, L2 and L3 at the connections 21 to 23. In contrast, no or only a low current flows via the neutral conductor N at the connection 24. In the case of a three-phase supply network with a maximum power of 22 kW, a current of at most 32 A can respectively flow via the connections 21, 22 and 23, for example.

Figure 5:
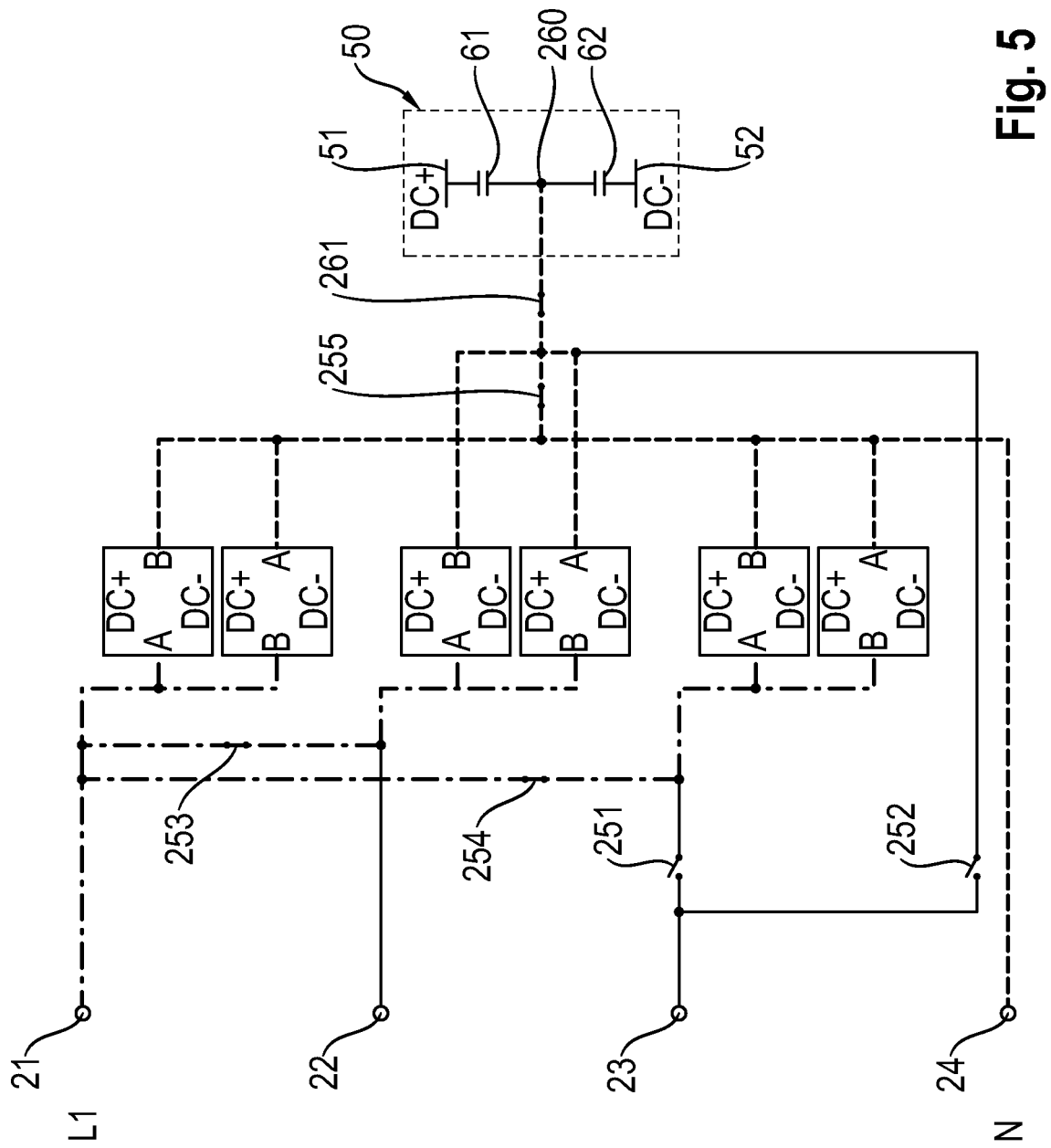
FIG. 5 shows a second configuration of the interconnection apparatus of FIG. 1.

FIG. 5 shows, by way of example, the connection of a European single-phase network having a phase L1 and a neutral conductor N. The phase L1 is connected to the connection 21, and the neutral conductor N is connected to the connection 24. The selected configuration is as follows:

The switches 253, 254 and 255 are turned on, and the switches 251 and 252 are turned off.

This results in the following interconnection:

The connection 21 is connected to the first circuit arrangement connections A of the circuit arrangements 31, 33 and 35 and is connected to the second circuit arrangement connections B of the circuit arrangements 32, 34 and 36.

The connection 24 is connected to the first circuit arrangement connections A of the circuit arrangements 32, 34 and 36 and is connected to the second circuit arrangement connections B of the circuit arrangements 31, 33 and 35.

As a result, all circuit arrangements 31 to 36 can be used for rectification, and the individual circuit arrangements 31 to 36 have a lower load and are loaded more uniformly as a result, and this increases the service life.

The switch 261 is turned on in order to connect the neutral conductor N to the point 260.

In the case of a single-phase supply network having a maximum power of 11 kW, a maximum current of 48 A respectively flows both via the connection 21 and via the connection 24.

Figure 6:
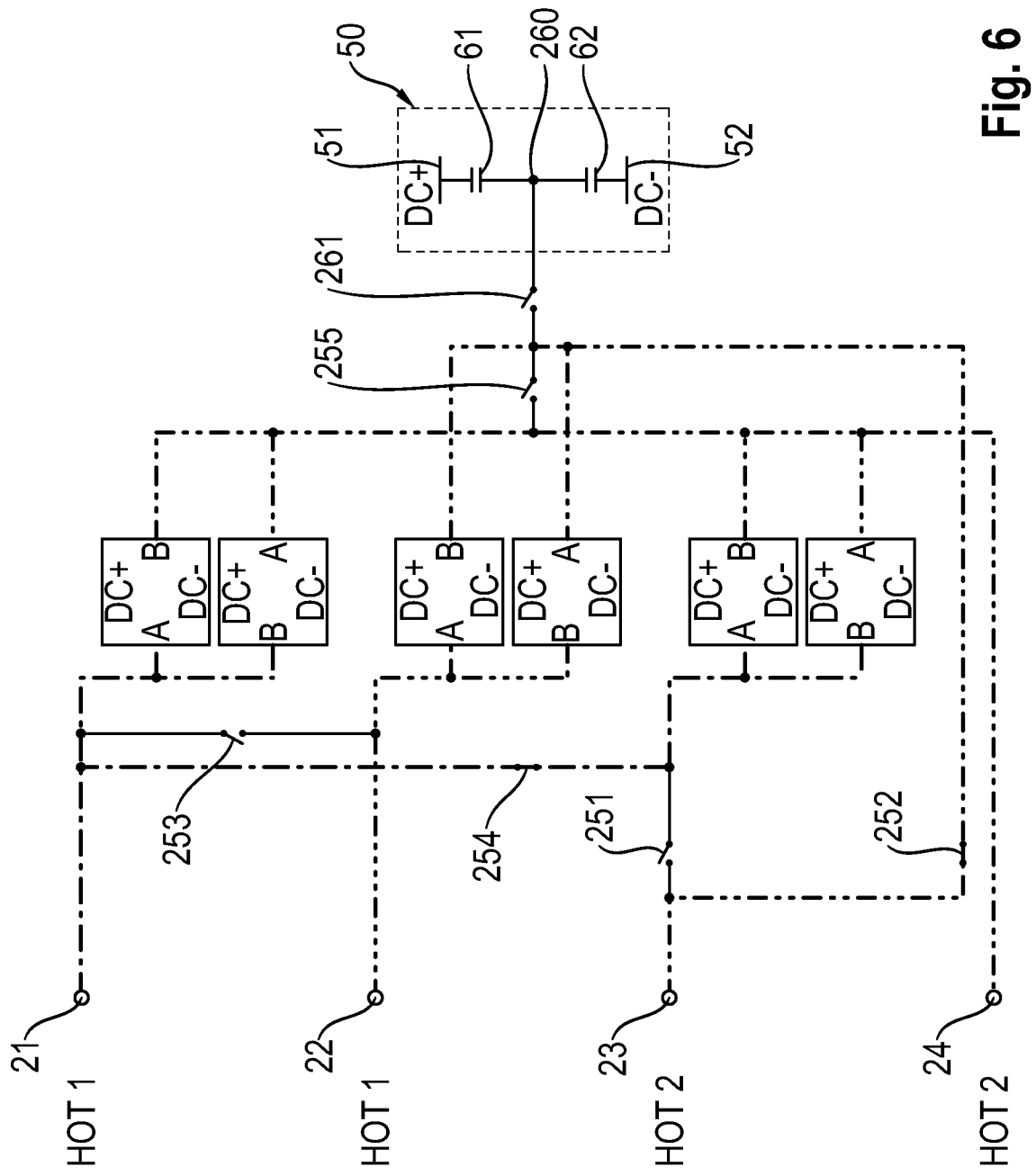
FIG. 6 shows a third configuration of the interconnection apparatus of FIG. 1.

FIG. 6 shows the connection of a supply network of the US split phase type which is a single-phase network having three conductors, a first phase of which is referred to as HOT1, a second phase of which is referred to as HOT2 and the protective conductor of which is referred to as PE. The phase HOT2 has a phase shift of 180° with respect to the phase HOT1. This is therefore not a three-phase network.

In this case, the interconnection apparatus 26 is configured as follows:

The switches 252 and 254 are turned on, and the switches 251, 253 and 255 are turned off.

The connection 21 is connected to the first circuit arrangement connections A of the circuit arrangements 31 and 35 and is connected to the second circuit arrangement connections B of the circuit arrangements 32 and 36.

The connection 22 is connected to the first circuit arrangement connection A of the circuit arrangement 33 and is connected to the second circuit arrangement connection B of the circuit arrangement 34.

The connection 23 is connected to the first circuit arrangement connection A of the circuit arrangement 34 and is connected to the second circuit arrangement connection B of the circuit arrangement 33.

The connection 24 is connected to the first circuit arrangement connections A of the circuit arrangements 32 and 36 and is connected to the second circuit arrangement connections B of the circuit arrangements 31 and 35.

In the exemplary embodiment, the phase HOT1 can be connected to the connections 21 and 22, and the phase HOT2 can be connected to the connections 23 and 24.

As a result, there are two current paths for the current between the phases HOT1 and HOT2. One current path runs between the connection 21 and the connection 24 via the circuit arrangements 31, 32, 35 and 36. The other current path runs between the connection 22 and the connection 23 via the circuit arrangements 33 and 34.

The circuit arrangements 31, 33 and 35 are therefore used in the opposite direction to the circuit arrangements 32, 34 and 36. This can also be referred to as inverse use of some of the circuit arrangements. This control produces new possibilities in comparison with a Vienna rectifier since, on account of the different position of the coils 91, the first line 51 can be supplied via some of the circuit arrangements and the line 52 can be supplied via the other circuit arrangements, for example during a positive half-cycle of the phase HOT1. This makes it possible to considerably reduce the ripple currents in the DC intermediate circuit 50. Such a configuration of the circuit arrangements and of the connections by means of the interconnection apparatus produces a so-called Weissach rectifier.

In experiments, it was determined that the voltage ripple of the rectifier 20 in the DC intermediate circuit 50 in the case of the US split phase supply network in the configuration in FIG. 6 is approximately 27% of the voltage ripple of a corresponding Vienna rectifier without reversing some of the circuit arrangements 31 to 36.

The switch 261 is turned off since a neutral conductor N is not available.

In the case of a single-phase three-conductor supply network, for example of the US split phase type, having a maximum power of 19.2 kW, a maximum current of 48 A results at the connections 21 and 24 and a maximum current of 32 A results at the connections 22 and 23.

This is advantageous, in particular, over an alternative interconnection of the connection 21 to the connection 22 and an interconnection of the connection 23 to the connection 24. In the case of such an interconnection, the maximum current at the connections 21 and 22 would together be 80 A and the maximum current at the connections 23 and 24 would likewise together be 80 A. However, it would not be clear how the total current is divided among the individual connections, and this depends, for example, on the resistance of the connections 21, 22, 23, 24 with respect to one another and on the resistance and number of switches. Therefore, the situation could arise, for example, in which a current of 70 A flows via the connection 21 and a current of 10 A flows via the connection 22. The connections 21, 22, 23, 24 would therefore have to be designed for higher maximum currents, and this is technically more complicated and more expensive. In contrast, the maximum current is guaranteed to be lower than 80 A by virtue of the separation of the current paths according to the exemplary embodiment in FIG. 6.

In the exemplary embodiment, the connections 21 and 24 are connected to one another via four circuit arrangements 31, 32, 35, 36 in each case and the connections 22 and 23 are connected via two circuit arrangements 33, 34 in each case. It is also possible to establish the connection via three circuit arrangements in each case, and this further reduces the maximum current at the connections 21 and 22. However, the design with three circuit arrangements in each case requires an interconnection apparatus 26 having additional switches.

Figure 7:
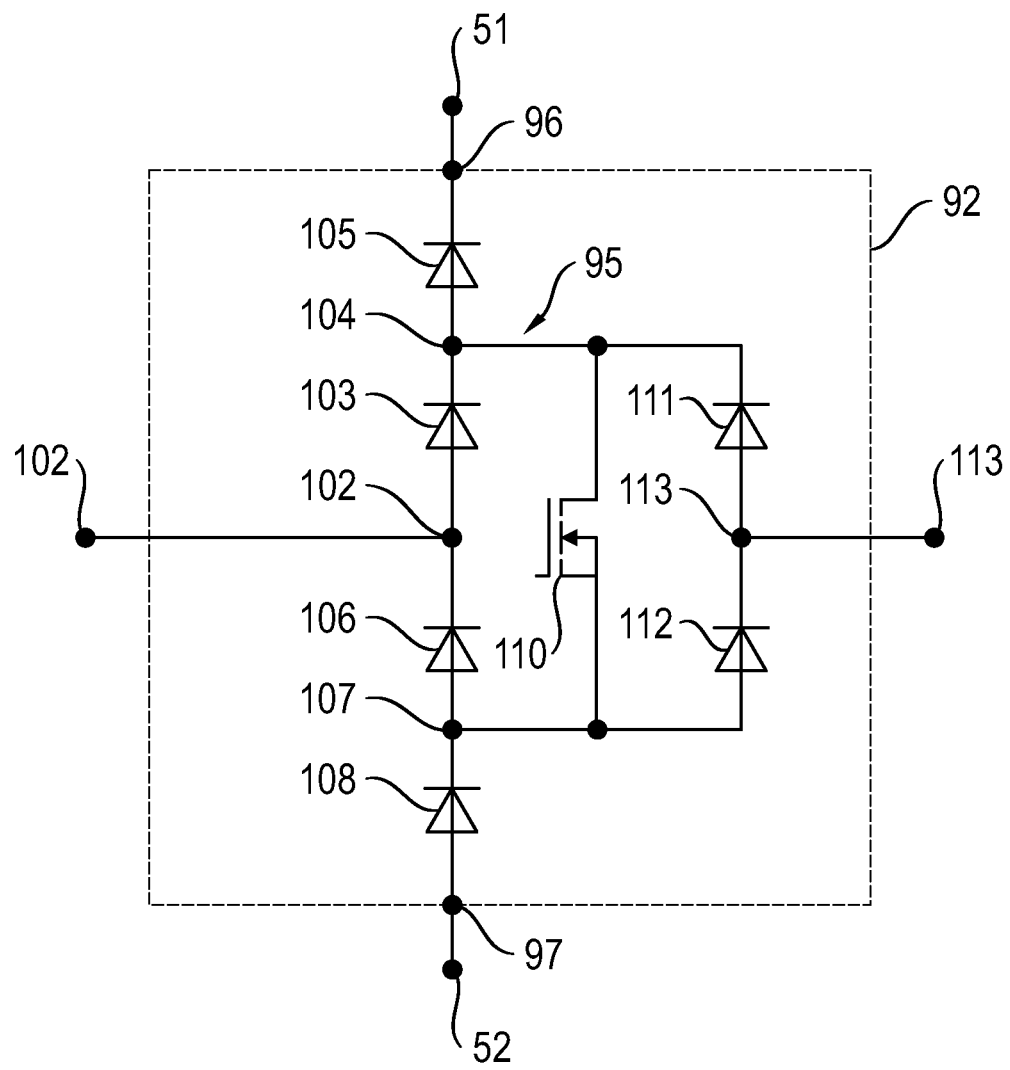
FIG. 7 shows a first embodiment for the changeover arrangement of FIG. 2 or 3.

FIG. 7 shows, by way of example, an embodiment of the changeover arrangement 92. The changeover arrangement 92 is designed like in the case of a Vienna rectifier.

The changeover arrangement 92 has the first changeover arrangement connection 102, the second changeover arrangement connection 113, the first output 96 and the second output 97. The changeover arrangement connections 102, 113 can also be referred to as bridge rectifier connections.

The changeover arrangement 92 has a bridge rectifier 95 and the controllable switch 110, as described in more detail below.

The changeover arrangement connection 102 is connected to a point 104 via a diode 103, and the point 104 is connected to the first output 96 via a diode 105. The changeover arrangement connection 102 is connected to a point 107 via a diode 106, and the point 107 is connected to the second output 97 via a diode 108. A controllable switch 110 is provided between the points 107 and 104. The switch 110 is designed as a MOSFET in the exemplary embodiment, but other electronic switches, such as IGBTs, are also for example possible. The changeover arrangement connection 113 is connected to the point 104 via a diode 111 and to the point 107 via a diode 112. The cathodes of the diodes 103, 105, 106, 108, 111, 112 are in each case connected on the side toward the first line 51 or the first output 96, and the anodes are in each case connected on the side toward the second line 52 or the second output 97. The method of operation of the Vienna rectifier is described for example in EP 0 660 498 A2.

If the controllable switch 110 is turned off in a first state Z1, the bridge rectifier 95 functions like a normal bridge rectifier. A current can flow from the changeover arrangement connections 102, 113 to the first output 96 via the diodes 103, 105, 111, and a current can flow from the second output 97 to the changeover arrangement connections 102, 113 via the diodes 108, 106, 112 since the corresponding diodes are forward-biased in these directions.

In contrast, if the controllable switch 110 is turned on in a second state Z2, a current can flow from the changeover arrangement connection 102 to the changeover arrangement connection 113 via the diode 103, the controllable switch 110 and the diode 112, or conversely a current can flow from the changeover arrangement connection 113 to the changeover arrangement connection 102 via the diode 111, the controllable switch 110 and the diode 106. Furthermore, a current can also flow from the changeover arrangement connections 102 and/or 113 to the first output 51, and/or a current can flow from the second output 52 to the changeover arrangement connections 102, 113.

Whether a current actually flows depends on the voltage conditions at the changeover arrangement connections 102, 113 and at the outputs 96, 97.

If the diodes 103, 104 are arranged on the side of the coil 91, the diodes 111, 112 may be weaker than the diodes 103, 104 since they have a lower load.

Figure 8:
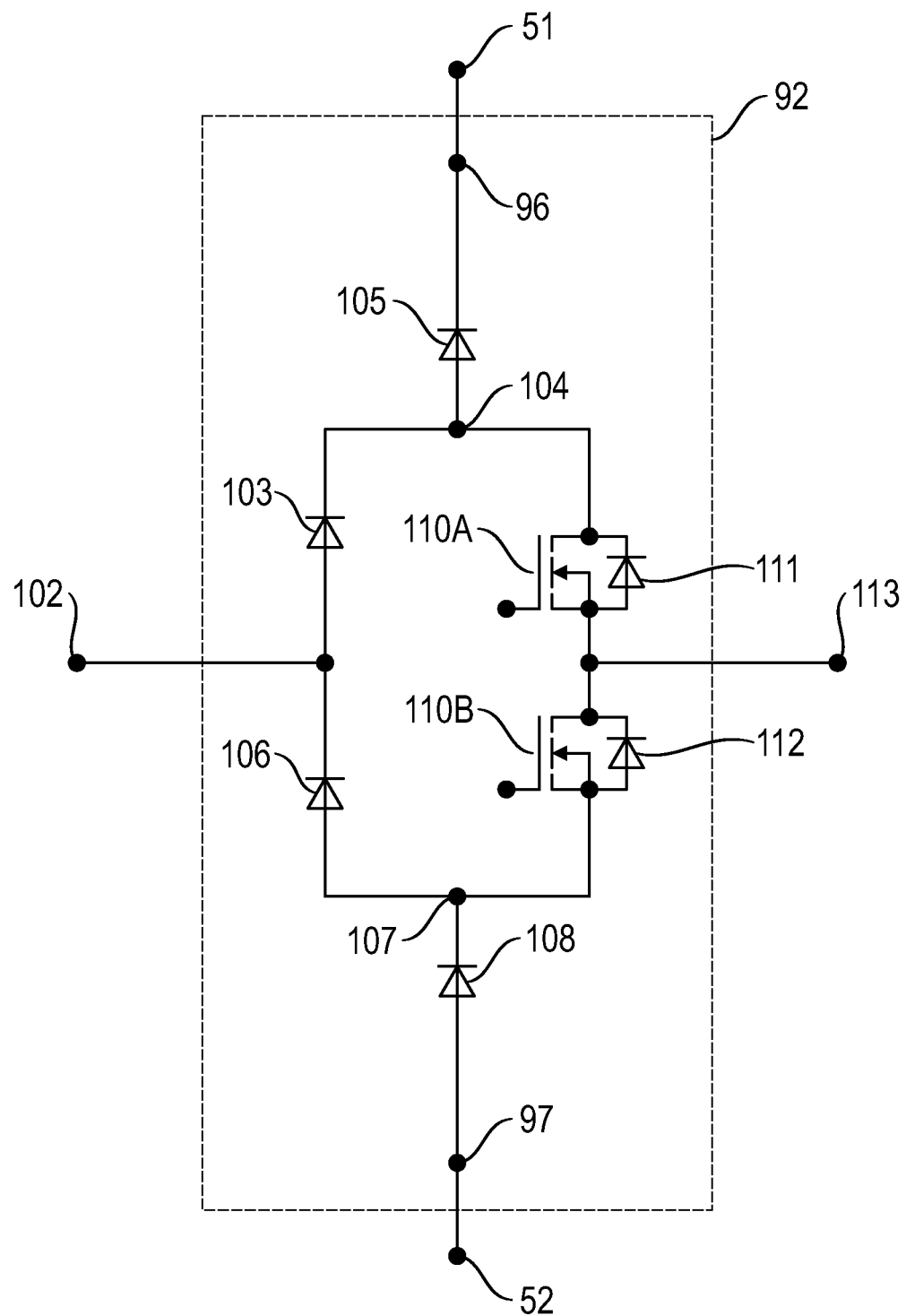
FIG. 8 shows a second embodiment for the changeover arrangement of FIG. 2 or 3.

FIG. 8 shows a further embodiment of the changeover apparatus 92. This changeover apparatus likewise has the changeover arrangement connections 102, 113, the diodes 103, 105, 106, 108, 111 and 112 and the points 104, 107, which are provided with the same reference signs as in Fi. 7. The switch 110 from FIG. 7 has been replaced with two switches 110A, 110B. The switch 110A is connected in parallel with the diode 111, and the switch 110B is connected in parallel with the diode 112. The diodes 111, 112 may be in the form of integrated inverse diodes of the respective semiconductor switch 110A, 110B or a diode which is additionally connected in parallel and preferably has a low forward voltage, for example a Schottky diode. The coil 91 is preferably respectively connected on the side of the bridge rectifier connection 102, with the result that the diodes 103, 106 are on the side of the coil 91. This makes it possible to reduce the current through the switches 110A, 110B and facilitates their commutation. In addition, in this embodiment, it is possible to use switches 110A, 110B without integrated inverse diodes, for example favorable IGBT switches. However, both variants are possible.

In the on, second state Z2, the switch 110A enables a current flow from the point 104 to the changeover arrangement connection 113, and, in the on, second state Z2, the switch 110B enables a current flow from the changeover arrangement connection 113 to the point 107.

In the first, off state of the switches 110A, 110B, the changeover apparatus 92 behaves like the changeover apparatus 92 from FIG. 7. In the second, on state of the switches 110A, 1106, the changeover apparatus 92 enables a current flow from the changeover arrangement connection 102 to the changeover apparatus connection 113 via the diode 103 and the switch 110A and enables a current flow from the changeover arrangement connection 113 to the changeover apparatus connection 102 via the switch 1106 and the diode 106. In contrast to the embodiment from FIG. 7, this circuit has lower power losses since two diodes are not connected in series, as in FIG. 7, in the case of a switch 110 which is on.

In contrast to the changeover apparatus 92 from FIG. 7, the changeover apparatus 92 from FIG. 8 is asymmetric with respect to the changeover apparatus connections 102, 113. The changeover apparatus connection 113 can be provided as a bridge rectifier connection 113 assigned to the coil 91, or else the changeover apparatus connection 102. The variant mentioned second (diodes 103, 106 and bridge rectifier connection 102 on the side of the coil 91) has the lower losses at the switches 110A, 1106.

The property of the changeover apparatuses 92 from FIG. 7 and FIG. 8 can be summarized as follows:
The changeover apparatus 92 is designed
  to enable a current from the changeover apparatus connection 102 or from the changeover apparatus connection 113 to the line 51,
  to enable a current from the line 52 to the changeover apparatus connection 102 or to the changeover apparatus connection 113,
  to prevent a current between the changeover apparatus connection 102 and the changeover apparatus connection 113 in a first changeover apparatus state Z1, and
  to enable a current between the changeover apparatus connection 102 and the changeover apparatus connection 113 in a second changeover apparatus state Z2.

The changeover apparatus 92 preferably has a bridge rectifier 103, 106, 111, 112 and at least one switch 110 or 110A, 110B, but more complicated circuits with logic modules are also possible.

Figure 9:
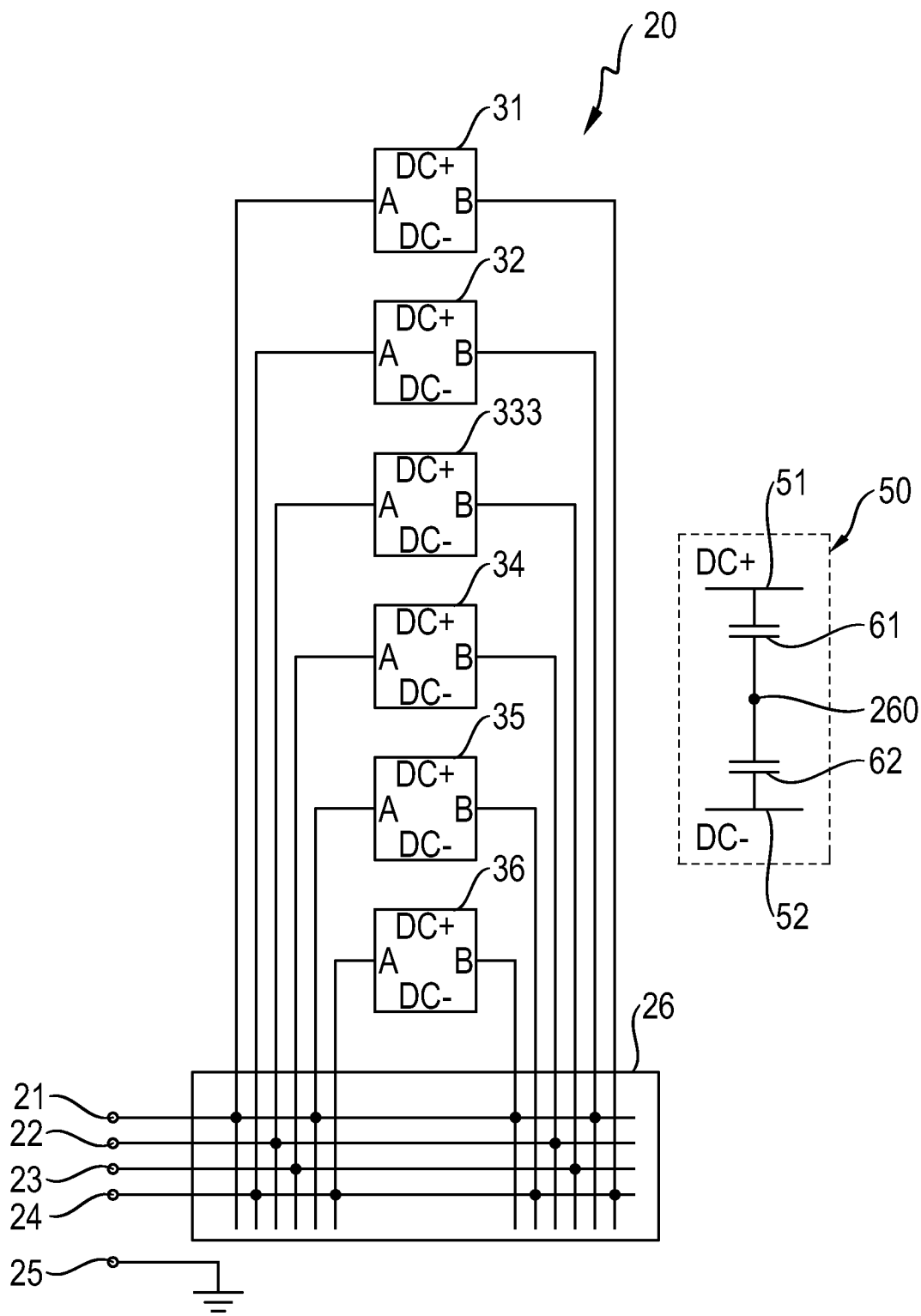
FIG. 9 shows a further embodiment of the rectifier arrangement having an interconnection matrix.

FIG. 9 shows a variant of the rectifier arrangement 20 in which the interconnection apparatus 26 has an interconnection matrix which has a largely free interconnection of the connections 21, 22, 23, 24 to the first circuit arrangement connections A and second circuit arrangement connections B of the circuit arrangements 31 to 36. Such an interconnection apparatus 26 enables each of the configurations which have already been shown and further configurations. The configuration shown corresponds to the configuration from FIG. 6, wherein the switches of the interconnection matrix which are turned on are illustrated as points. As can be seen, 48 switches are required for all possible combinations. In contrast, the interconnection apparatus 26 from FIG. 1 requires only five switches 251, 252, 253, 254 and 255.

Numerous variations and modifications are of course possible within the scope of the present invention.

A capacitor—not illustrated—can be respectively connected in parallel with the circuit arrangements 31 to 36 and, as an X capacitor, can act as part of an interference suppression filter.

What is claimed is:

1. A rectifier arrangement (20) for rectifying an AC voltage (L1, L2, L3; HOT1, HOT2) into a DC voltage (DC+, DC−), the rectifier arrangement (20) comprising connections (21, 22, 23, 24), circuit arrangements (31, 32, 33, 34, 35, 36), an interconnection apparatus (26) and an intermediate circuit (50), wherein:
    the connections (21, 22, 23, 24) comprise a first connection (21), a second connection (22), a third connection (23) and a fourth connection (24), the fourth connection (24) being connected to a neutral conductor of the AC voltage,
    the intermediate circuit (50) has a first line (51), a second line (52) and at least one capacitor (61, 62) between the first line (51) and the second line (52),
    the circuit arrangements (31, 32, 33, 34, 35, 36) each have: a first circuit arrangement connection (A) and a second circuit arrangement connection (B), each of the circuit arrangements (31, 32, 33, 34, 35, 36) further having a changeover arrangement (92) and a coil (91) connected in series with the changeover arrangement (92), the changeover arrangement (92) and the coil (91) of each of the circuit arrangements (31, 32, 33, 34, 35, 36) being between the first and second circuit arrangement connections (A, B) of the respective circuit arrangement (31, 32, 33, 34, 35, 36), an order of the changeover arrangement (92) and the coil (91) between the first circuit arrangement connection (A) and the associated second circuit arrangement connection (B) of the respective circuit arrangement (31, 32, 33, 34, 35, 36) being the same in each case,
    the changeover arrangements (92) are interconnected to the first line (51) and to the second line (52) of the intermediate circuit (50), and
    the interconnection apparatus (26) has switches disposed and configured to selectively enable at least a first configuration and a second configuration between the connections (21, 22, 23, 24) and the circuit arrangements (31, 32, 33, 34, 35, 36), wherein
    in the first configuration, the circuit arrangements (31 to 36) form a first group (31, 32, 35, 36) and a second group (33, 34), with
        the first connection (21) being electrically connected to the circuit arrangements (31, 32) in the first group (31, 32, 35, 36) but not electrically connected to the circuit arrangements (33, 34) in the second group (33, 34) and the fourth connection (24) being electrically connected to the circuit arrangements (31, 32, 35, 36) in the first group (31, 32, 35, 36), but not electrically connected to the circuit arrangements (33, 34) in the second group (33, 34), and with
        the second connection (22) and the third connection (23) being electrically connected to the circuit arrangements (33, 34) in the second group (33, 34), but not electrically connected to the circuit arrangements (31, 32, 35, 36) in the first group (31, 32, 35, 36), whereby the first configuration enables two independent current paths via the first group and the second group of the circuit arrangements (31, 32, 33, 34, 35, 36), and wherein
    in the second configuration at least one of the connections (24; 24, 21) is electrically connected to all of the circuit arrangements (31-36).

2. The rectifier arrangement of claim 1, in which the order between the first circuit arrangement connection (A) and the second circuit arrangement connection (B) is as follows:
    first circuit arrangement connection (A),
    changeover arrangement (92),
    coil (91),
    second circuit arrangement connection (B).

3. The rectifier arrangement of claim 1, wherein the order between the first circuit arrangement connection (A) and the second circuit arrangement connection (B) is as follows:
    first circuit arrangement connection (A),
    coil (91),
    changeover arrangement (92),
    second circuit arrangement connection (B).

4. The rectifier arrangement (20) of claim 1, wherein, in the case of the second configuration, the interconnection apparatus (26) is designed to electrically connect the at least one connection (24; 24, 21), which is connected to all circuit arrangements (31-36), to at least one first circuit arrangement connection (A) of one of the circuit arrangements (31-36) and to at least one second circuit arrangement connection (B) of another of the circuit arrangements (31-36).

5. The rectifier arrangement (20) of claim 1, wherein the interconnection apparatus (26) is designed to enable a third configuration where at least two of the connections (24, 21) are electrically connected to all circuit arrangements (31-36).

6. The rectifier arrangement (20) of claim 1, wherein the interconnection apparatus (26) is designed to enable a fourth configuration where the fourth connection (24) is electrically connected to all circuit arrangements (31-36), and the first connection (21), the second connection (22) and the third connection (23) are each electrically connected to an associated subset (31, 32; 33, 34; 35, 36) of the circuit arrangements (31-36).

7. The rectifier arrangement (20) of claim 6, wherein, in the case of the fourth configuration, the first connection (21), the second connection (22) and the third connection (23) are each electrically connected to at least one first circuit arrangement connection (A) and to at least one second circuit arrangement connection (B) of the associated subset (31, 32; 33, 34; 35, 36) of the circuit arrangements (31-36).

8. The rectifier arrangement of claim 1, wherein the number of circuit arrangements (31, 32, 35, 36) in the first group (31, 32, 35, 36) is not equal to the number of circuit arrangements (33, 34) in the second group.

9. The rectifier arrangement of claim 1, wherein the number of circuit arrangements (31, 32, 33) in the first group is equal to the number of circuit arrangements (34, 35, 36) in the second group.

10. The rectifier arrangement of claim 1, wherein there are an even number of circuit arrangements (31-36), and wherein, in the case of the second configuration, the at least one connection (24; 24, 21), which is connected to all circuit arrangements (31-36), is electrically connected to the second circuit arrangement connection (B) in the case of half of the circuit arrangements (32, 34, 36) and is electrically connected to the first circuit arrangement connection (A) in the case of the other half of the circuit arrangements (31, 33, 35).

11. The rectifier arrangement of claim 1, wherein the circuit arrangements (31-36) have at least two first circuit arrangements (31, 32, 33) and at least two second circuit arrangements (34, 35, 36),
- the at least two first circuit arrangements (31, 32, 33) each are connected electrically to a first point (134) via the first circuit arrangement connection (A) or via the second circuit arrangement connection (B),
- the at least two second circuit arrangements (34, 35, 36) each are connected electrically to a second point (258) via the first circuit arrangement connection (A) or via the second circuit arrangement connection (B),
- and the interconnection apparatus (26) is designed to enable either an electrical connection of the first point (134) and the second point (258) or a disconnection of the electrical connection of the first point (134) and the second point (258).

12. The rectifier arrangement of claim 1, the circuit arrangements comprise at least six circuit arrangements (31-36).

13. The rectifier arrangement of claim 1, wherein:
- each first circuit arrangement connection (A) of one circuit arrangement (31-36) is connected permanently to at least one second circuit arrangement connection (B) of another circuit arrangement (31-36), and
- each second circuit arrangement connection (B) of one circuit arrangement (31-36) is connected permanently to at least one first circuit arrangement connection (A) of another circuit arrangement (31-36).

* * * * *